Patented Sept. 30, 1930

1,776,771

UNITED STATES PATENT OFFICE

EDWARD HERBERT BOOMER, OF EDMONTON, ALBERTA, CANADA, ASSIGNOR TO THE GOVERNORS OF THE UNIVERSITY OF ALBERTA, OF EDMONTON, CANADA

PROCESS FOR THE OXIDATION OF NATURAL GAS

No Drawing.   Application filed July 23, 1928.   Serial No. 294,946.

This invention relates to improvements in processes for the oxidation of natural gas to methyl alcohol and formaldehyde and other alcohols and aldehydes, and the objects of the invention are to maintain a high yield of alcohol and aldehyde on partial oxidation of natural gas, and it consists in the use of high temperature and pressure with a catalyst as hereinafter described.

In practicing the process I employ a gas mixture containing natural gas and oxygen equal in volume to one-half the volume of the hydrocarbons in the gas mixture. In chemical terms, this would mean 1 gram atom of oxygen to each gram molecule of hydrocarbon in the gas.

This mixture is then subjected to a pressure of from 60 to 300 atmospheres with corresponding temperatures from 250° C. to 500° C. in the presence of a catalyst. The catalyst should contain zinc oxide and lead or lead oxide and may contain nickel, chromium oxide of thallium or its oxide.

The catalysts may be metals of the fourth, sixth and eighth groups mixed with the metals of the second and third groups. As an example of a catalyst I have used take dilute solution of potassium chromate, zinc nitrate and lead nitrate and mix them so as to obtain an equimolar mixture of zinc and lead chromates. The precipitate is washed, filtered, pressed and dried at 110 degrees centigrade. It is then crushed and heated to 400 centigrade in an atmosphere of hydrogen. Or a porous refractory material may be soaked in the nitrates of metals of the second and third groups and then in a solution of a vanadic or chromic salt followed by ignition, washing and drying. Certain natural gases such as the Viking field near Edmonton are to be preferred as they contain a high percentage of methane. It may be necessary to purify the gas of its sulphur compounds or else regenerate the catalyst at intervals because of the poisoning action of sulphur.

Apart from the use of the pressure or temperature with the catalyst, the process is carried out in the same way as those processes as are at present used for the oxidation of natural gas under ordinary pressures. I find, however, that the use of the high pressures and temperatures, referred to above, enables an increased yield to be obtained.

Some other patents on the same process but at atmospheric pressure are as follows. Gleck, D. R. P. 107014 and also D. R. P. 286731, suggest the passage of natural gas and air over granulated pumice or copper maintained at 800 degrees centigrade, the process being circulatory removing the formaldehyde after each cycle by a system of scrubbers. Lance peroxide or persulphuric acid in the presence of ferrous sulphate presumably as a catalyst. The Sauerstoff and Stickstoff Industria D. R. P. 214155/1906, and von Unruth, U. S. P. 891753/1907 claim the use of tan bark as a catalyst stating that methane is oxidized in air at 30 to 50 degrees centigrade. It is more probable that their formaldehyde arose from the decomposition of the tan bark. Fernekes, U. S. P. 1038546/1912 described a furnace for the fractional combustion of methane.

As many changes could be made in the above process, and many apparently widely different embodiments of my invention within the scope of the claims set forth, without departing from the spirit or scope thereof, it is intended that all matter contained in the specification shall be interpreted in an illustrative and not in a limiting sense.

What I claim as my invention is:

1. The herein described process for the purpose specified which comprises subjecting a mixture of natural gas and oxygen to a pressure of from 60 to 300 atmospheres to a temperature of 250° C. to 500° C. in the presence of a catalyst.

2. The herein described process for the purpose specified which comprises subjecting a mixture of natural gas and oxygen to a pressure of from 60 to 300 atmospheres to a temperature 250° C. to 500° C., in the presence of a mixture of zinc and lead chromates.

3. The herein described process for the purpose specified which comprises subjecting a mixture of natural gas and oxygen to a pressure of from 60 to 300 atmospheres to a temperature of 250° C. to 500° C., in the presence of a mixture of a salt of a second group metal and a salt of a fourth group metal.

In witness whereof I have hereunto set my hand.

EDWARD HERBERT BOOMER.